United States Patent
Bruckner

[15] 3,706,249
[45] Dec. 19, 1972

[54] PROGRAMMED CONTROL SYSTEM FOR PUNCHING MACHINE

[72] Inventor: Samuel R. Bruckner, Washington, Pa.

[73] Assignee: Xetca, Inc.

[22] Filed: March 30, 1970

[21] Appl. No.: 23,831

[52] U.S. Cl. ..........................83/69, 83/210, 83/229, 83/267, 83/411 R, 83/413, 408/3
[51] Int. Cl. .................................................B26d 5/34
[58] Field of Search..........83/71, 206, 222, 225, 380, 83/69, 229, 210, 267, 411 R, 365, 367, 370, 413; 408/3, 71

[56] References Cited

UNITED STATES PATENTS

| 3,420,128 | 1/1969 | Russell | 83/71 |
|---|---|---|---|
| 3,118,334 | 1/1964 | Blaha | 83/71 |
| 3,245,556 | 4/1966 | Thumim | 83/71 X |
| 3,263,884 | 8/1966 | Doerfling | 83/71 |
| 362,218 | 5/1887 | Kittredge | 83/411 R X |
| 414,669 | 11/1889 | Baldwin | 83/411 R |
| 2,227,835 | 1/1941 | Kelsh et al. | 83/411 R |
| 3,002,403 | 10/1961 | Estabrook | 408/3 |
| 3,116,652 | 1/1964 | Bregnard | 408/3 |
| 3,163,057 | 12/1964 | Drummond et al. | 408/3 |
| 3,165,952 | 1/1965 | Thompson et al. | 83/210 X |
| 3,459,079 | 8/1969 | De Gain | 83/267 X |

Primary Examiner—Frank T. Yost
Attorney—Clarence A. O'Brien and Harvey B. Jacobson

[57] ABSTRACT

A workpiece is continuously indexed relative to a cyclically operable punch, programmed by a pattern control system to automatically control punch operations. A code pattern wheel is intermittently advanced while operation of the punch is interrupted, to generate pulse signals that space the locations on the workpiece at which punch operations are performed.

8 Claims, 6 Drawing Figures

PATENTED DEC 19 1972

Samuel R. Bruckner
INVENTOR.

BY Clarence A. O'Brien
and Harvey B. Jacobson
Attorneys

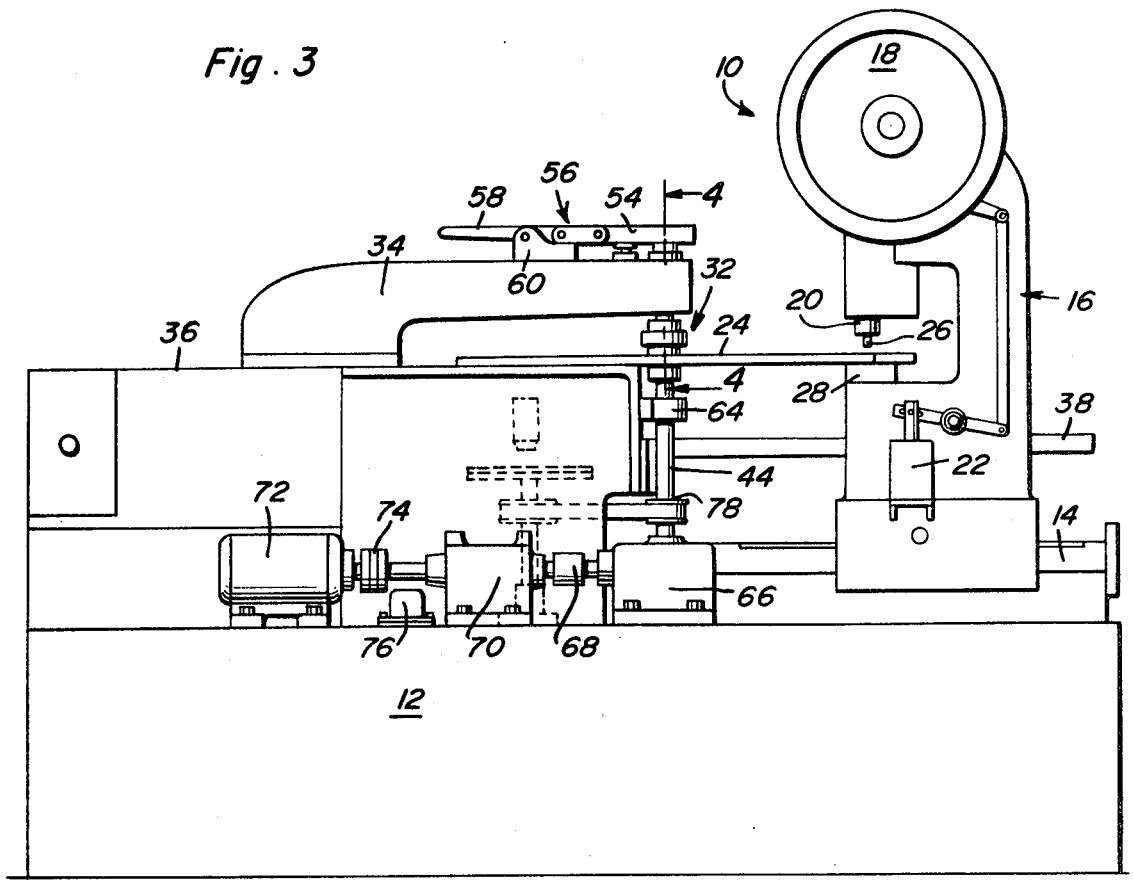
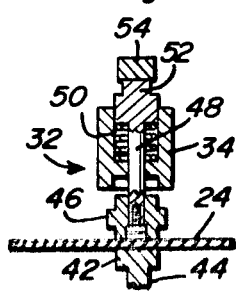
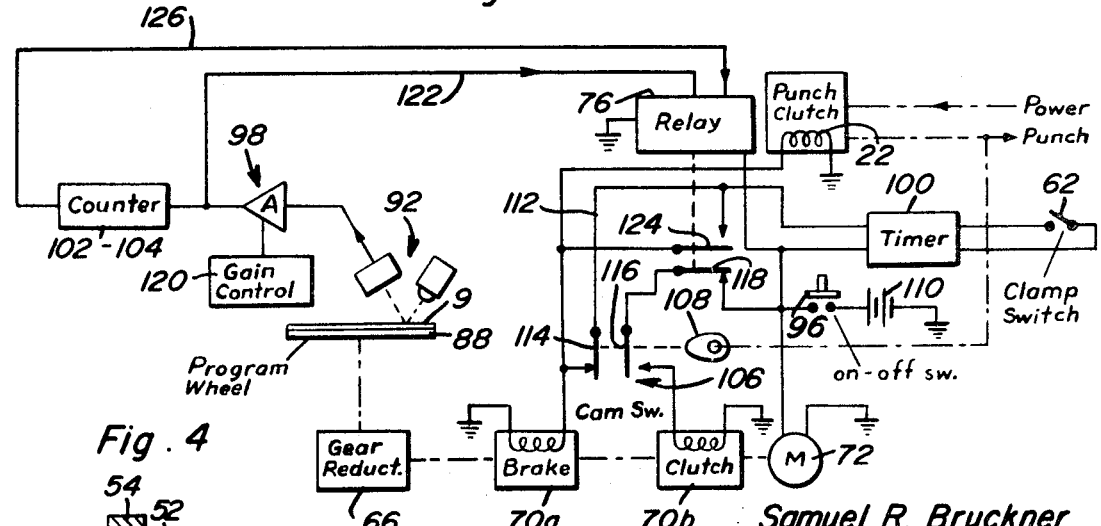

3,706,249

PROGRAMMED CONTROL SYSTEM FOR PUNCHING MACHINE

This invention relates to automatic machine operation control and more particularly to the automatic control of a punch machine for performing a plurality of punch operations at specific locations on a workpiece.

Pattern control systems for automatic programmed operation of machine tools is generally well known. In such programming control systems, the workpiece is usually moved along a controlled path or its motion is timed in accordance with a program predetermined by coded information on a moving member. Thus, the programming controls are limited to the movement of the workpiece which requires expensive and precision work holding and work moving equipment. Such automatically programmed systems are nevertheless justified by the reduction in production costs and the increase in manufacturing efficiency resulting therefrom.

An important object of the present invention is to provide a pattern control system for automatic programmed operation of machine tools employing work engaging members that are cyclically reciprocated through a fixed stroke, including power punches, drilling machines and milling machines requiring a minimum amount of structural modification. A further object is to provide a pattern controlled system for power operated machine tools of the aforementioned type capable of performing operations at a plurality of spaced locations on a workpiece with a minimum of layout and setup time.

In accordance with the present invention, a workpiece is intermittently indexed relative to a power operated, reciprocating punch for example, so that a plurality of work operations may be performed on the workpiece while cyclic operation of the machine tool is interrupted in accordance with a predetermined control pattern. The control pattern may be formed by light contrasting surface portions on a programming disc wheel that is rotated relative to an optical detector generating pulse signals at preselected intervals of time to intermittently stop rotation of the pattern wheel and simultaneously initiate a new cycle at the end of which rotation of the pattern program wheel is resumed. A drive interrupting brake and clutch interconnects a gear reduction drive for the code program wheel with a continuously energized motor, the motor also being operative to impart indexing movement to the work holder within which the workpiece is clamped. Cyclic operation of the punch machine is controlled through a solenoid actuated power clutch without modification or variation of its normal operational cycle, mode or stroke.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is a side elevational view of the machine as viewed from the side opposite that of FIG. 1.

FIG. 4 is an enlarged partial sectional view taken substantially through a plane indicated by section line 4—4 in FIG. 3.

FIG. 5 is a simplified electrical circuit diagram illustrating the automatic control system of the present invention.

Figure 1:
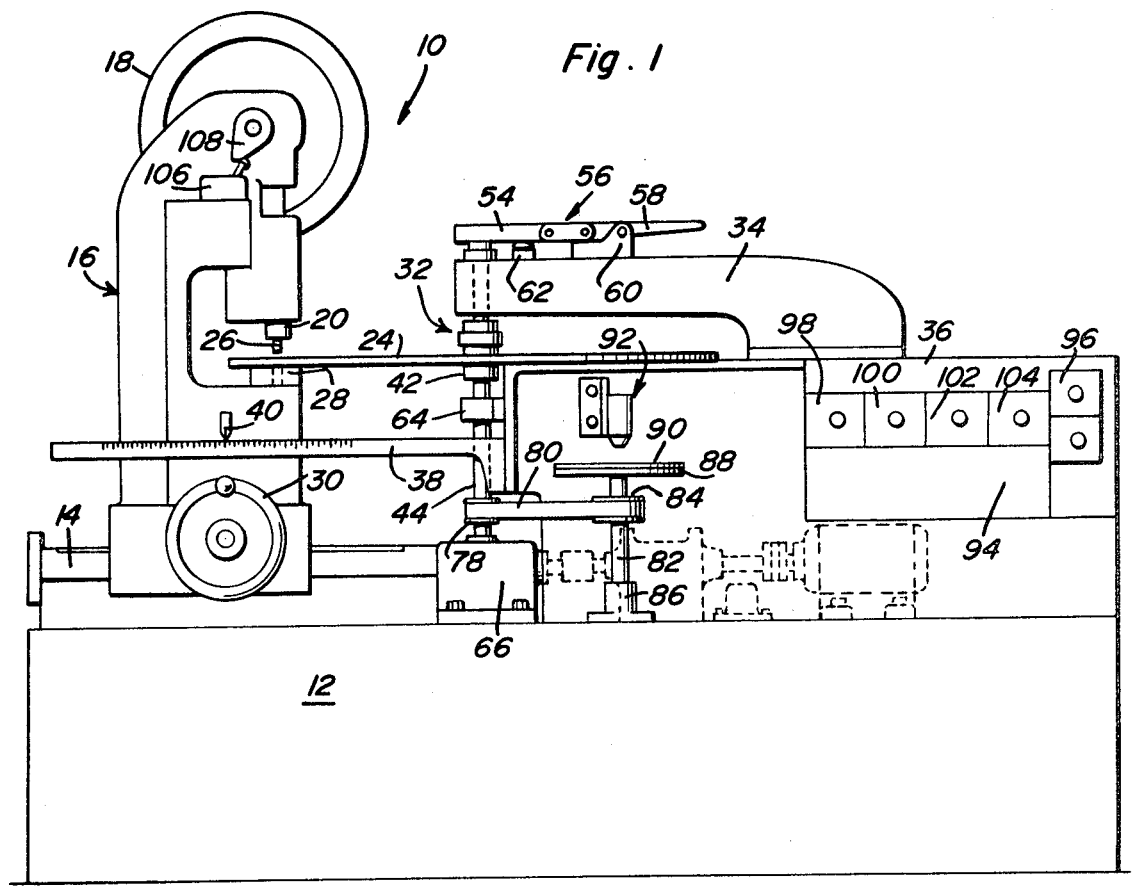
FIG. 1 is a side elevational view of one type of machine tool with which the pattern control system of the present invention is associated.
Figure 2:
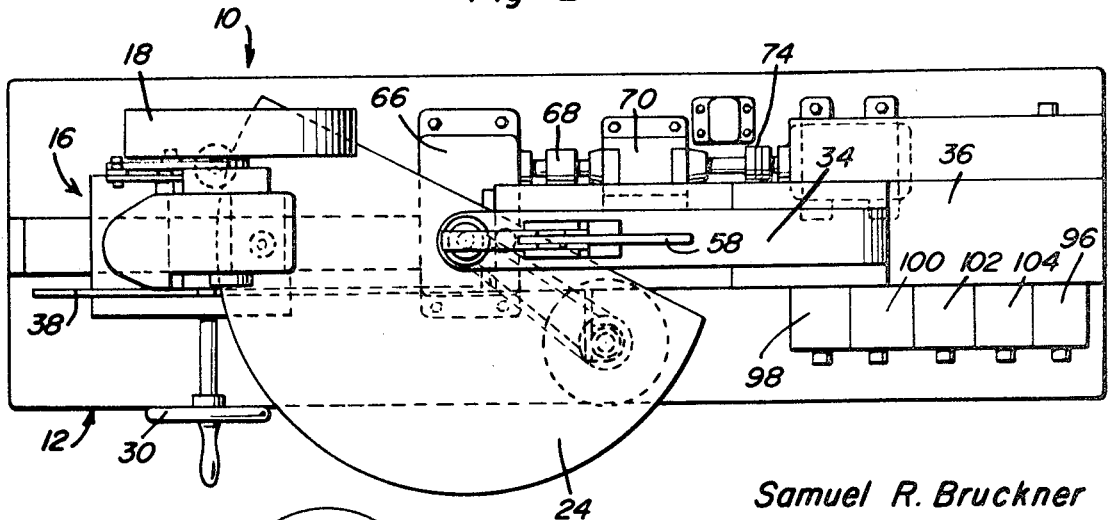
FIG. 2 is a top plan view of the machine illustrated in FIG. 1.

Referring now to the drawings in detail, FIGS. 1, 2 and 3 illustrate a power operated punch machine generally denoted by reference numeral 10 with which the present invention is associated. Thus, in the illustrated embodiment, the punch machine includes a supporting bed 12 on which ways 14 are fixedly mounted so as to adjustably support the frame 16 of the punch machine. This portion of the punch machine is conventional in that it includes a flywheel 18 to which power is applied from any suitable source, the flywheel being drivingly coupled to a vertically reciprocable ram 20 by means of a single revolution type of clutch mechanism (not shown). Thus, the clutch mechanism is operative upon pulsing of a clutch control solenoid 22 as shown in FIG. 3 to downwardly advance and retract the punch ram 20 through a predetermined stroke so as to perform a punch operation on a workpiece 24 by means of the tool element 26 positioned above a die component 28 over which the workpiece is positioned.

By means of the adjusting handwheel 30, the frame 16 of the punch machine may be adjustably positioned in a horizontal direction relative to the workpiece 24 which is adapted to be held within a work-engaging clamp mechanism 32 supported by the workholding arm 34 projecting toward the punch machine frame 16 from the top of a housing 36 to which the work-holding arm is secured. The housing is fastened to the machine bed 12 in spaced relation to the machine frame 16 and has an elongated scale member 38 secured thereto. The scale member is provided with a calibrated scale and projects alongside of the frame 16 which is provided with an indicator 40 as shown in FIG. 1 in order to permit the operator to gauge the radial distance of the punch element 26 from the rotational center about which the workpiece 24 is adapted to be indexed by the work-engaging clamp mechanism 32.

As more clearly seen in FIG. 4, the work clamp mechanism 32 includes an axially fixed support 42 secured to the upper end of an indexing shaft 44 for support of the workpiece on a rotational center. The workpiece is adapted to be held in frictional engagement with the support 42 by a vertically movable clamp element 46 rotatably mounted on the lower end of a clamp rod 48 that is biased upwardly to a release position by spring 50 enclosed within the forward end portion of the work holder arm 34 through which the clamp rod 48 is slidable. The upper end of the clamp rod is provided with a bearing portion 52 adapted to be engaged by the toggle link 54 of a clamp actuating device generally referred to by reference numeral 56 as more clearly seen in FIGS. 1 and 3. An actuating lever 58 is associated with the actuating linkage device so that when it is depressed to the position illustrated, the toggle link 54 will hold the clamp rod 48 in its lower work-engaging position against the bias of the spring 50. When the actuating lever 58 is displaced upwardly, relative to its pivotal mounting 60 on the work-holder arm 34, the clamp mechanism 32 will disengage the workpiece so that it may be removed, replaced or repositioned. When the workpiece is clamped in position, by the clamp mechanism 32, the toggle link 54 actuates a clamp control switch 62 which functions in a manner to be hereafter explained.

When the workpiece is engaged by the clamp mechanism 32, rotation is imparted thereto about the axis of the indexing shaft 44 journaled by the bearing assembly 64 secured to the housing 36 vertically spaced above a gear reduction assembly 66 from which the indexing shaft 44 extends. A shaft coupling 68 connects the input to the gear reducer 66 to the output of a clutch and brake mechanism 70 to which an electric drive motor 72 is connected by the coupling 74. The clutch and brake mechanism 70 as well as the power clutch controlling solenoid 22 are under control of a relay component 76 mounted on the bed of the machine.

Figure 6:
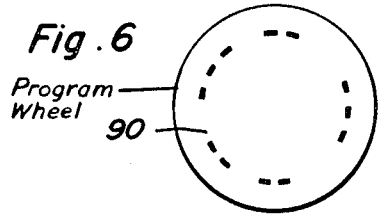
FIG. 6 is a top plan view of a typical coded pattern control wheel utilized with the present invention.

As more clearly seen in FIG. 1, The indexing shaft 44 is provided with a drive pulley 78 about which a drive belt 80 is entrained for transmitting rotation to control shaft 82 through driven pulley wheel 84. The control shaft is journaled in a vertical position by means of the bearing assembly 86 secured to the bed of the machine. A program control wheel 88 is secured to the upper end of the control shaft and mounts a coded pattern 90 as depicted for example in FIG. 6. The coded pattern constitutes a source of signals that are developed by a photoelectric signal generator generally referred to by reference numeral 92 fixedly mounted above the program control wheel. It will be apparent that pulse signals are developed upon rotation of the program control wheel simultaneously with indexing movement of the workpiece.

The housing 36 also mounts electronic control equipment within a control box 94 exposing on-off switches 96. Also mounted on the control box is an impulse amplifier 98, a timer 100 and counters 102 and 104. The electrical control system also has associated therewith, a cam actuated switch mechanism 106 mounted on the punch machine frame for engagement by an actuating cam 108 synchronized with the cyclic, reciprocatory movement of the punch ram 20. The cam switch 106 is adapted to be actuated by the cam 108 during the upstroke movement of the ram 20 in order to control operations as will be explained hereafter.

Referring now to FIG. 5, it will be noted that when the on-off switch 96 is closed a connection is made to a source of electrical energy 110 diagrammatically shown as a grounded battery. Thus, the drive motor 72 is energized in order to impart indexing movement to the workpiece through the engaged clamp mechanism 32 and the program control wheel 88 through the gear reducer 66 when the clutch 70b is engaged and the brake 70a disengaged within the clutch brake mechanism 70. In order to begin indexing operation, the workpiece must be clamped within the mechanism 32 so that only then is the clamp switch 62 closed to initiate operation of the timer 100 thereby completing a circuit from the source of electrical energy 110 through conductor 112 and normally engaged switch 114 in the cam switch mechanism 106 to the brake engaging coil associated with the brake 70a. The initial pulse from the timer 100 will ensure that the program control wheel 88 is held stationary and at the same time will energize the clutch control solenoid 22 so as to initiate one cycle of operation of the punch machine to perform a punching operation on the stationary workpiece. As the punch ram 20 completes its downstroke and begins its upstroke movement, the cam 108 actuates the cam switch mechanism 106 thereby opening the switch 114 and closing the normally open switch 116. Power from the timer 100 is thereby disconnected from the brake 70a and the clutch control solenoid 22 while at the same time power is supplied through the normally closed relay switch 118 and the actuated cam switch 116 to the clutch engaging coil of the clutch 70b. Thus, when the operational cycle of the punch machine is completed, the drive motor 72 will be drivingly coupled to the program control wheel to cause advancement thereof.

The program control wheel is advanced from its initial position a distance corresponding to the indexing movement of the workpiece 24. When the workpiece has been advanced a desired distance from its initial position, a dark line or other contrasting indicator on the program disc 90 will be sensed by the photoelectric signal generating device 92 producing a signal pulse that is amplified by the amplifier 98, the sensitivity of which may be adjusted by means of the gain control 120. Thus, a suitable drive pulse is conducted from the amplifier by conductor 122 to the relay component 76 to thereby open the normally closed relay switch 118 and close the normally opened relay switch 124. Opening of the relay switch 118 disconnects the supply of power to the clutch engaging coil while closing of the relay switch 124 conducts power from the timer to the brake engaging coil and the clutch control solenoid 22 to begin another cycle if a minimum period of time has elapsed from the beginning of the previous cycle as determined by the timer 100 necessarily exceeding the duration of the punch cycle. The cycle will therefore be repeated at intervals determined by the code markings on the program disc 90 in order to perform punching operations on the workpiece at desired spacings. When a predetermined number of punch operations have been performed, a stop signal will be generated by the counters communicated by stop signal line 126 with the relay component 76 so as to prevent energization of the same. The control system may then be reset and the workpiece withdrawn by release of the clamp mechanism 32 opening the clamp switch 62.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:

1. In combination with a work holder having a work-engaging clamp and tool means having an operating cycle of predetermined duration, means for programming operation of the tool means on a workpiece operatively positioned by the work holder relative to the tool means, comprising power driven means drivingly connected to the work holder for movement of the workpiece relative to the tool means, signal generating means responsive to said movement of the workpiece for intermittently initiating operation of the tool means, control means responsive to said cyclic operation of the tool means for controlling the signal generating means and timing means connected to the control means for limiting operation of the tool means to a minimum interval between operating cycles.

2. In combination with a work holder having a work-engaging clamp and cyclically operable tool means having a power control device, means for programming operation of the tool means on a workpiece operatively positioned by the work holder relative to the tool means, comprising power driven means drivingly connected to the work holder for movement of the workpiece relative to the tool means, signal generating means responsive to said movement of the workpiece for intermittently initiating cyclic operation of the tool means, and control means responsive to said cyclic operation of the tool means for controlling the signal generating means, said control means including drive interrupting means drivingly interconnecting the power driven means and the signal generating means for cyclic advancement, signal responsive means connected to the drive interrupting means and the power control device for simultaneously interrupting movement of the signal generating means and initiating operation of the tool means and cam operated switch means actuated by the tool means for advancing the signal generating means while operation of the tool means is interrupted, said signal generating means including a code pattern member drivingly connected to the power driven means, means cooperating with the code pattern member for developing pulse signals, and counter means connected to the signal developing means for producing a stop signal in response to a predetermined number of pulse signals.

3. The combination of claim 2 including timing means for preventing recycling operation of the tool means before elapse of a minimum period of time and switch means actuated by the clamp for initiating operation of the timing means and the control means.

4. In combination with a work holder having a work-engaging clamp and cyclically operable tool means having a power control device, means for programming operation of the tool means on a workpiece operatively positioned by the work holder relative to the tool means, comprising power driven means drivingly connected to the work holder for movement of the workpiece relative to the tool means, signal generating means responsive to said movement of the workpiece for intermittently initiating cyclic operation of the tool means, and control means responsive to said cyclic operation of the tool means for controlling the signal generating means, said control means including drive interrupting means drivingly interconnecting the power driven means and the signal generating means for cyclic advancement, signal responsive means connected to the drive interrupting means and the power control device for simultaneously interrupting movement of the signal generating means and initiating operation of the tool means and cam operated switch means actuated by the tool means for advancing the signal generating means while operation of the tool means is interrupted, timing means for preventing recycling operation of the tool means before elapse of a minimum period of time and switch means actuated by the clamp for initiating operation of the timing means and the control means.

5. In combination with a work holder having a work-engaging clamp and cyclically operable tool means having a power control device, means for programming operation of the tool means on a workpiece operatively positioned by the work holder relative to the tool means, comprising power driven means drivingly connected to the work holder for movement of the workpiece relative to the tool means, signal generating means responsive to said movement of the workpiece for intermittently initiating cyclic operation of the tool means, and control means responsive to said cyclic operation of the tool means for controlling the signal generating means, timing means for preventing recycling operation of the tool means before elapse of a minimum period of time and switch means actuated by the clamp for initiating operation of the timing means and the control means.

6. In combination with a work holder having a work-engaging clamp and cyclically operable tool means having a power control device, means for programming operation of the tool means on a workpiece operatively positioned by the work holder relative to the tool means, comprising power driven means drivingly connected to the work holder for movement of the workpiece relative to the tool means, a code pattern member drivingly connected to the power driven means, means cooperating with the code pattern member for developing pulse signals, drive interrupting means drivingly interconnecting the power driven means and the code pattern member, means responsive to said pulse signals and connected to the drive interrupting means and the power control device for simultaneously interrupting movement of the code pattern member and initiating operation of the tool means and cam operated switch means actuated by the tool means for advancing the code pattern member while operation of the tool means is interrupted, timing means for preventing recycling operation of the tool means before elapse of a minimum period of time and switch means actuated by the clamp for initiating operation of the timing means and the control means.

7. In combination with a work holder having a work-engaging clamp and cyclically operable tool means having a power control device, means for programming operation of the tool means on a workpiece operatively positioned by the work holder relative to the tool means, comprising power driven means drivingly connected to the work holder for movement of the workpiece relative to the tool means, a code pattern member drivingly connected to the power driven means, means cooperating with the code pattern member for developing pulse signals, drive interrupting means drivingly interconnecting the power driven means and the code pattern member, means responsive to said pulse signals and connected to the drive interrupting means and the power control device for simultaneously interrupting movement of the code pattern member and initiating operation of the tool means and cam operated switch means actuated by the tool means for advancing the code pattern member while operation of the tool means is interrupted, counter means connected to the code member cooperating means for disabling the pulse signal responsive means after a predetermined number of pulse signals.

8. In combination with a work holder and tool means operated through a predetermined cycle, means for indexing a workpiece relative to the tool means, and programming control means for interrupting operation of the tool means to automatically space locations on the workpiece where tool operations are performed, the programming control means including pattern control means driven simultaneously with the indexing means for generating pulse signals, common drive means connected to the indexing means and the pattern control means for advancement thereof only while operation of the tool means is interrupted, and time-limited means responsive to said pulse signals for interrupting said advancement of the pattern control means to resume operation of the tool means after completion of a preceding cycle.

* * * * *